United States Patent
Irie

(10) Patent No.: US 7,921,894 B2
(45) Date of Patent: Apr. 12, 2011

(54) TIRE MOLDING MACHINE

(75) Inventor: Tomohiro Irie, Tokyo (JP)

(73) Assignee: Bridgestone Corporation, Tokyo (JP)

(*) Notice: Subject to any disclaimer, the term of this patent is extended or adjusted under 35 U.S.C. 154(b) by 938 days.

(21) Appl. No.: 10/588,083

(22) PCT Filed: Dec. 24, 2004

(86) PCT No.: PCT/JP2004/019386
§ 371 (c)(1),
(2), (4) Date: Jul. 16, 2007

(87) PCT Pub. No.: WO2005/072942
PCT Pub. Date: Aug. 11, 2005

(65) Prior Publication Data
US 2008/0003319 A1    Jan. 3, 2008

(30) Foreign Application Priority Data
Jan. 30, 2004 (JP) .................... 2004-023059

(51) Int. Cl.
*B29D 30/32* (2006.01)
(52) U.S. Cl. ........................ 156/403; 156/131
(58) Field of Classification Search .............. 156/403, 156/406.2, 131, 135
See application file for complete search history.

(56) References Cited

U.S. PATENT DOCUMENTS

| 4,343,671 A | * | 8/1982 | Enders .................. 156/401 |
| 2005/0142238 A1 | | 6/2005 | Tsujimoto et al. |

FOREIGN PATENT DOCUMENTS

| EP | 1 295 708 A | 3/2003 |
|---|---|---|
| JP | A-62-60637 | 3/1987 |
| JP | A 9-11358 | 1/1997 |
| JP | A 11-268149 | 10/1999 |
| JP | A-2001-341211 | 12/2001 |
| JP | A 2003-145640 | 5/2003 |
| JP | A 2003-145644 | 5/2003 |
| JP | A 2003-311848 | 11/2003 |
| WO | WO 03/045675 A1 | 6/2003 |

OTHER PUBLICATIONS

Mar. 20, 2008 Office Action issued in European Application No. 04 807 742.4-2307.

* cited by examiner

*Primary Examiner* — Geoffrey L Knable
(74) *Attorney, Agent, or Firm* — Oliff & Berridge, PLC

(57) ABSTRACT

A tire molding machine includes a pair of bead core supporting devices for holding respective bead cores, which are arranged on radially outer side of a carcass band, so that the bead core has a center axis with a controllable inclination angle. The bead core supporting device (4), which controls the inclination angle of the bead core center axis, includes an annular upright plate 32), a bead holder ring (13) secured to the annular upright plate, for holding the bead core (B) in parallel manner, and bead holder ring posture control means (14) for controlling the inclination angle of the center axis of the bead holder ring relative to the center axis of the annular upright plate, within an angular range including zero degree.

13 Claims, 11 Drawing Sheets

FIG. 11
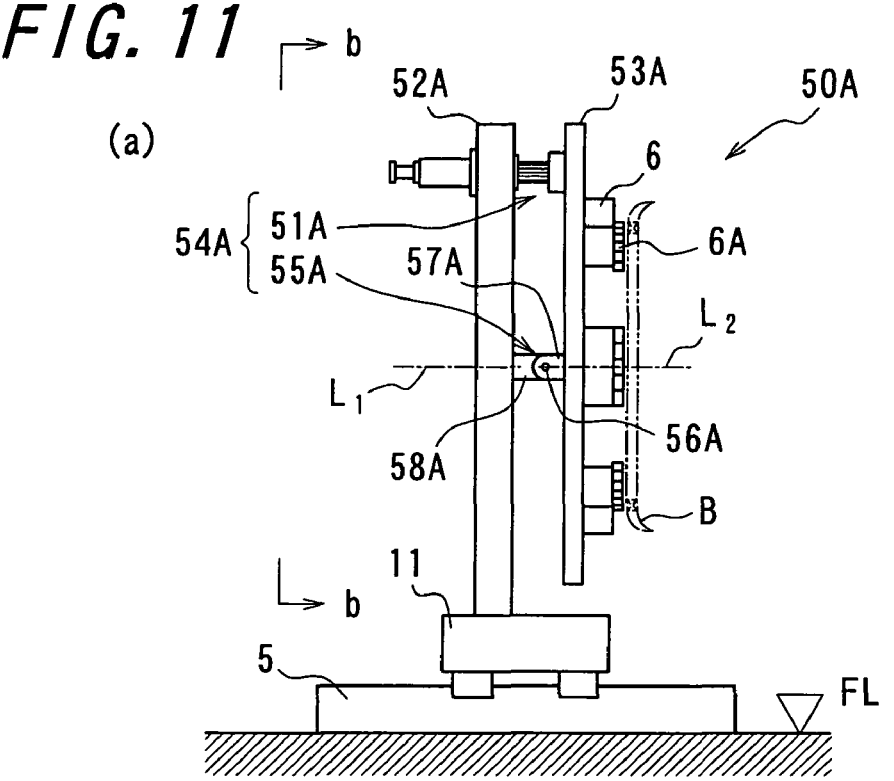
(a)
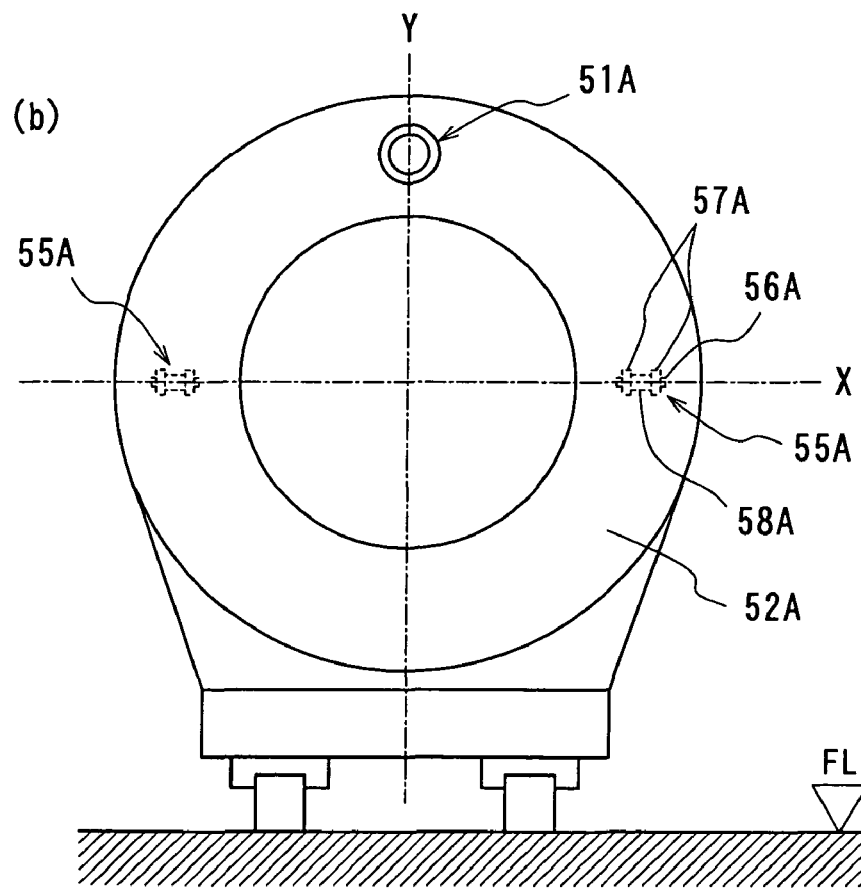
(b)

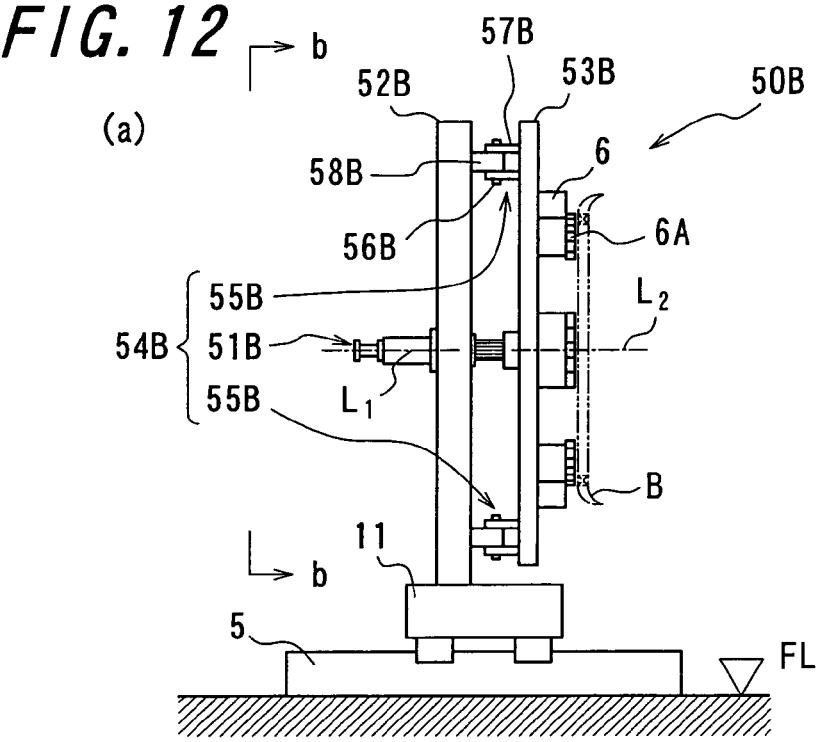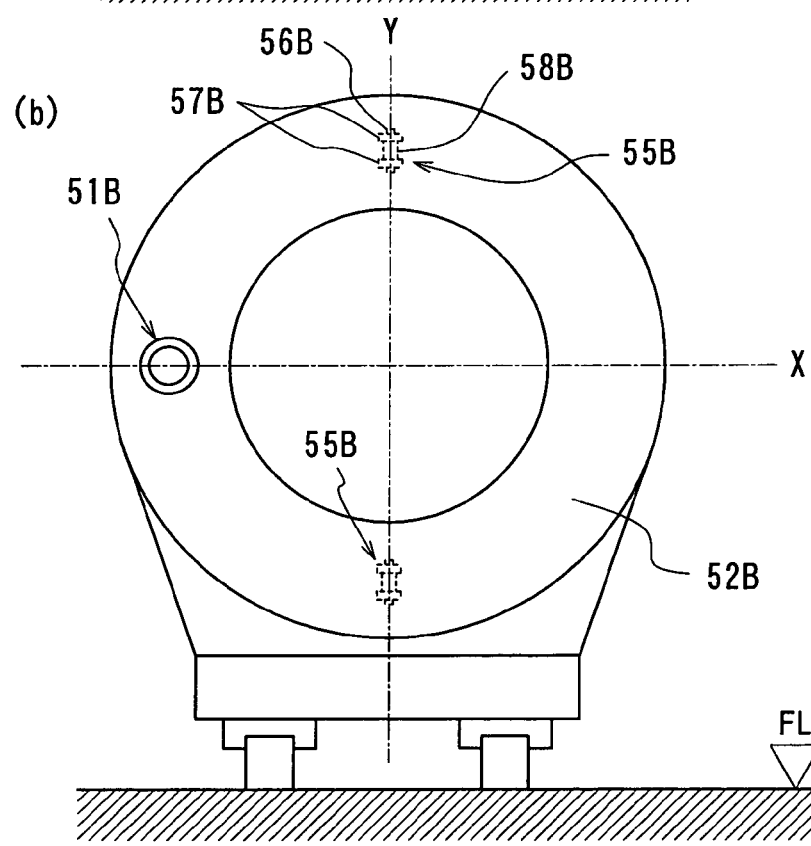
FIG. 12

TIRE MOLDING MACHINE

TECHNICAL FIELD

The present invention relates to a tire molding machine capable of improving the uniformity of the tire, in particular, the level of radial force variation ("RFV") by arranging a pair of bead core supporting devices for holding the bead cores on the radially outer side of the carcass band such that the bead core so held has a center axis with a controllable inclination angle.

BACKGROUND ART

For improving the RFV level of tires, there have been proposed a manufacturing method and a tire molding machine for carrying out the method, wherein the radial force or radial runout of a product tire is measured in advance, over the entire periphery thereof, and the angle of the center axis of the bead core for a subsequently manufactured tire is controlled relative to the center axis of the carcass band. Such a technology is disclosed, for example, in the pamphlet of International Publication WO 03/045675.

This molding machine includes a pair of bead core supporting devices for holding respective bead rings which are arranged on a radially outer side of a carcass band and spaced axially from each other by a predetermined distance, and a molding drum provided with bead lock portions for radially expanding these portions of the carcass band, which are situated on the radially inner side of the bead rings, to thereby urge such carcass band portions against the bead cores, wherein at least one of the bead core supporting devices is capable of controlling the inclination angle of the center axis of the bead core held thereby.

More specifically, the above-identified patent document discloses a first embodiment of the tire molding machine that includes a molding drum having a horizontal center axis, and bead core supporting devices each comprising a base portion, a substantially vertical bead holder ring arranged on the base portion, and a bead holder ring posture control means provided for the base portion, for controlling the posture of the bead holder ring relative to the base portion. Also disclosed is a second embodiment of the tire molding machine that includes a plurality of segments, e.g., six segments, for holding the bead core, which can be independently controlled and positioned in the axial direction of the molding drum, so as to control the inclination angle of the center axis of the bead core.

However, in the case of the first embodiment of the prior art, wherein the bead holder ring posture control means is arranged on the base portion, when it is desired to modify an existing tire molding machine, which cannot control the inclination angle of the center axis of the bead core, so as to include the bead holder ring posture control means, the center axis of the bead holder ring must be necessarily situated above the center axis of the tire molding drum. It may be then necessary to carry out an extensive modification with respect to the basic structure so as to change the height of the center axis of the molding drum.

Furthermore, in the case of the second embodiment of the prior art, the plurality of segments must be each provided with a driving means for controlling the axial position, thereby making the system complex in structure, beside that when the inclination angle of the bead core is increased relative to a vertical axis, it may become difficult to accurately hold the bead cores due to steps that are likely formed between the segments.

DISCLOSURE OF THE INVENTION

Task to be Solved by the Invention

The present invention has been achieved in view of these problems of the prior art. It is an object of the invention to provide a tire molding machine, which does not require an extensive modification of existing system, which is simple in structure, and which is capable of accurately holding the bead cores by means of the bead core supporting devices.

Measures for Solving the Task

A first aspect of the present invention resides in a tire molding machine comprising a pair of bead core supporting devices for supporting respective bead rings arranged on a radially outer side of a carcass band and axially spaced by a predetermined distance from each other, and a molding drum including a bead lock section for radially expanding those portions of the carcass band, which are situated on radially inner side of the bead cores so as to urge the carcass band against the bead cores, said tire molding machine being so designed that at least one of the bead cores has a center axis with a controllable inclination angle, wherein:

at least one of said bead core supporting devices, which is capable of holding the bead core to have a center axis with a controllable inclination angle, comprises an annular upright plate, a bead holder ring secured to the annular upright plate, and bead holder ring posture control means for controlling an inclination angle of a center axis of the bead holder ring relative to the annular upright plate, within an angular range including zero degree, wherein said bead holder ring serves to hold the bead core in parallel with a surface of the ring.

A second aspect of the present invention resides in a tire molding machine according to the first aspect, wherein said bead holder ring posture control means serves to control the inclination angle of the center axis of the bead holder ring in two different directions.

A third aspect of the present invention resides in a tire molding machine according to the first aspect, wherein both of said bead core supporting devices comprise respective bead holder ring posture control means, said bead holder ring posture control means each serving to control the inclination angle of the center axis of the bead holder ring in a single direction, said angular control directions being different from each other among the respective bead core holder rings.

A fourth aspect of the present invention resides in a tire molding machine according to any one of the first to the third aspects, wherein said bead holder ring posture control means comprises spherical bearings arranged at not less than two locations on the bead holder ring, linear motion shafts each extending in a direction perpendicular to the annular upright plate and having a tip end which is pivotally connected to the bead holder ring in omni-directional manner by the spherical bearing, and shaft moving means for moving the linear motion shafts to desired positions in an axial direction of the annular upright plate.

A fifth aspect of the present invention resides in a tire molding machine according to the fourth aspect, wherein said linear motion shaft comprises a ball screw rod engaged with a female screw in the annular upright plate, said shaft moving means comprises a servomotor with a reduction means, for rotating the ball screw rod directly or indirectly through a gear mechanism, and said annular upright plate is axially slidably provided with a ball spline or a support shaft, said ball spline or support shaft having a tip end which is pivotally connected to the bead holder ring in omni-directional manner, by a spherical bearing provided on the bead holder ring.

A sixth aspect of the present invention resides in a tire molding machine according to any one of the first to the fifth aspects, wherein said bead core supporting device is movable in an axial direction of the molding drum.

EFFECTS OF THE INVENTION

With the features according to the first aspect of the present invention, the bead holder ring serves to hold the bead core in parallel with its ring surface so that it is possible to change the orientation of the center axis of the bead core simply by controlling the inclination angle of the center axis of the bead holder ring. As a result, it is possible to realize a bead core supporting device with a simple structure and to accurately hold the bead cores. Furthermore, the bead holder ring is secured to the annular upright plate, and bead holder ring posture control means is provided for controlling the inclination angle of the center axis of the bead holder ring relative to the annular upright plate, so as to control the orientation of the center axis of the bead core. Therefore, when it is desired to modify an existing tire molding machine without a control function for the inclination angle of the center axis of the bead core, so as to afford with such function, it is unnecessary to change the height of the center axis of the bead holder ring and must be necessarily situated above the center axis of the tire molding drum, and to thereby eliminate requirement for an extensive modification.

With the features according to the second aspect of the present invention, since the bead holder ring posture control means serves to control the inclination angle of the center axis of the bead holder ring in two different directions, it is necessary only for one of the bead core supporting devices to be capable of controlling the inclination angle of the center axis of the bead core. Thus, when such function is added to an existing system without the control function for the inclination angle of the bead core, the required modification can be performed easily and at low cost.

With the features according to the third aspect of the present invention, since the bead holder ring posture control means each serves to control the inclination angle of the center axis of the bead holder ring in a single direction, it is possible to realize a bead holder ring posture control means with a simple configuration.

With the features according to the fourth aspect of the present invention associated with the bead holder ring posture control means, it is possible to control the posture of the center axis of the bead holder ring y means of a simple configuration.

With the features according to the fifth aspect of the present invention, since the bead holder ring is inclined by controlling the servomotor with the reduction means and thereby advancing or retracting the ball screw rod, it is possible to highly accurately control the inclination angle of the center axis of the bead holder ring. Moreover, since the bead holder ring is supported by a ball spline or a support shaft, the bead holder ring is supported with high rigidity to provide an improved positioning accuracy of the bead holder ring.

With the features according to the sixth aspect of the present invention, since the bead core supporting device is movable in an axial direction of the molding drum, it is possible to ensure that the bead holder ring is held and moved by the bead core supporting device to a desired axial position on the radially outer side of the carcass band.

BRIEF DESCRIPTION OF THE DRAWINGS

FIGS. 11(*a*) and 11(*b*) are front view and side view, respectively, showing one of the bead core supporting devices in the third embodiment; and FIGS. 12(*a*) and 12(*b*) are front view and side view, respectively, showing the other bead core supporting device in the third embodiment.

BEST MODE FOR CARRYING OUT THE INVENTION

First Embodiment

Figure 1:
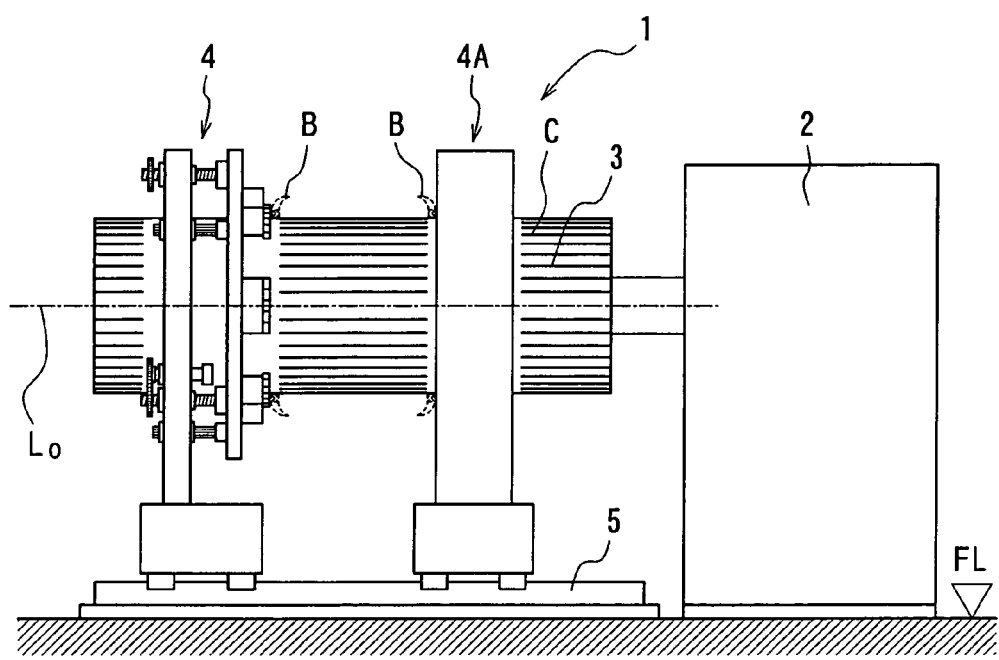
FIG. 1 is a schematic front view of the tire molding machine according to a first embodiment of the present invention.

The present invention will be further described below with reference to preferred embodiment shown in the drawings, wherein FIG. 1 is a schematic front view of the tire molding machine 1 according to a first embodiment of the present invention. The tire molding machine 1 includes a machine main body 2, a molding drum 3 rotatably supported by the machine main body 2 in a cantilever manner and adapted to be applied with tire constitutive members including a carcass band C, and a pair of bead core supporting devices 4, 4A for holding bead cores B that are arranged on a radially outer side of the carcass band C applied on the molding drum 2 and axially spaced from each other by a predetermined distance.

These bead core supporting devices 4, 4A are movable along guide rails 5 that extend in the axial direction of the molding drum 3, so as to position the bead cores B held thereby at axially predetermined locations on the radially outer side of the carcass band C. One of the bead core supporting devices 4, 4A, i.e., the bead core supporting device 4, is capable of controlling the inclination angle of the center axis of the bead core B. The other bead core supporting device 4A is designed to fixedly maintain the center axis of the bead core B coaxially to the center axis L0 of the molding drum 3.

Figure 2:
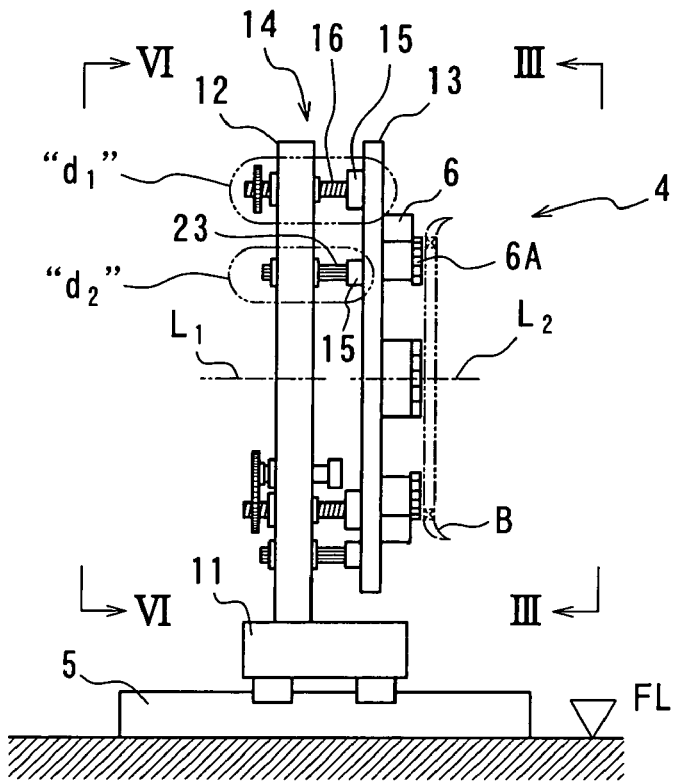
FIG. 2 is a front view of the bead core supporting device that is capable of controlling the inclination angle of the center axis of the bead core.
Figure 3:
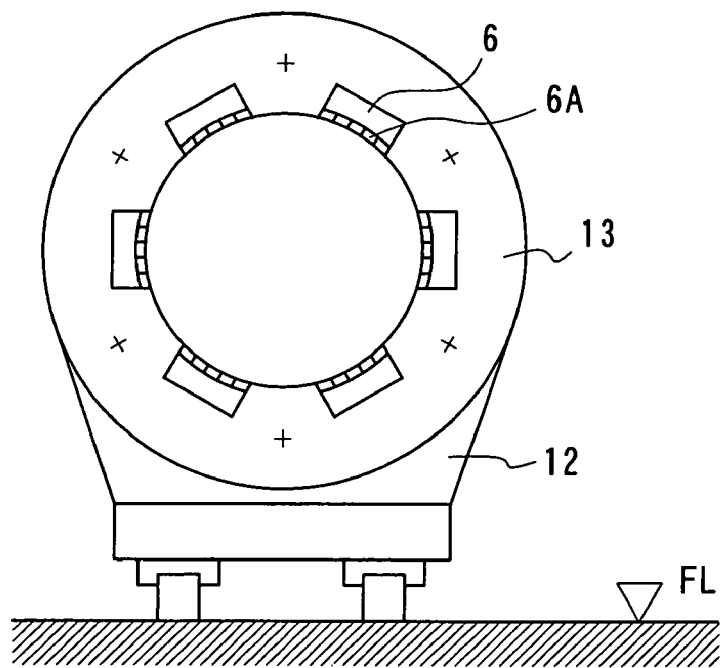
FIG. 3 is a side view as seen in the direction of arrows III-III in FIG. 2.
Figure 4:
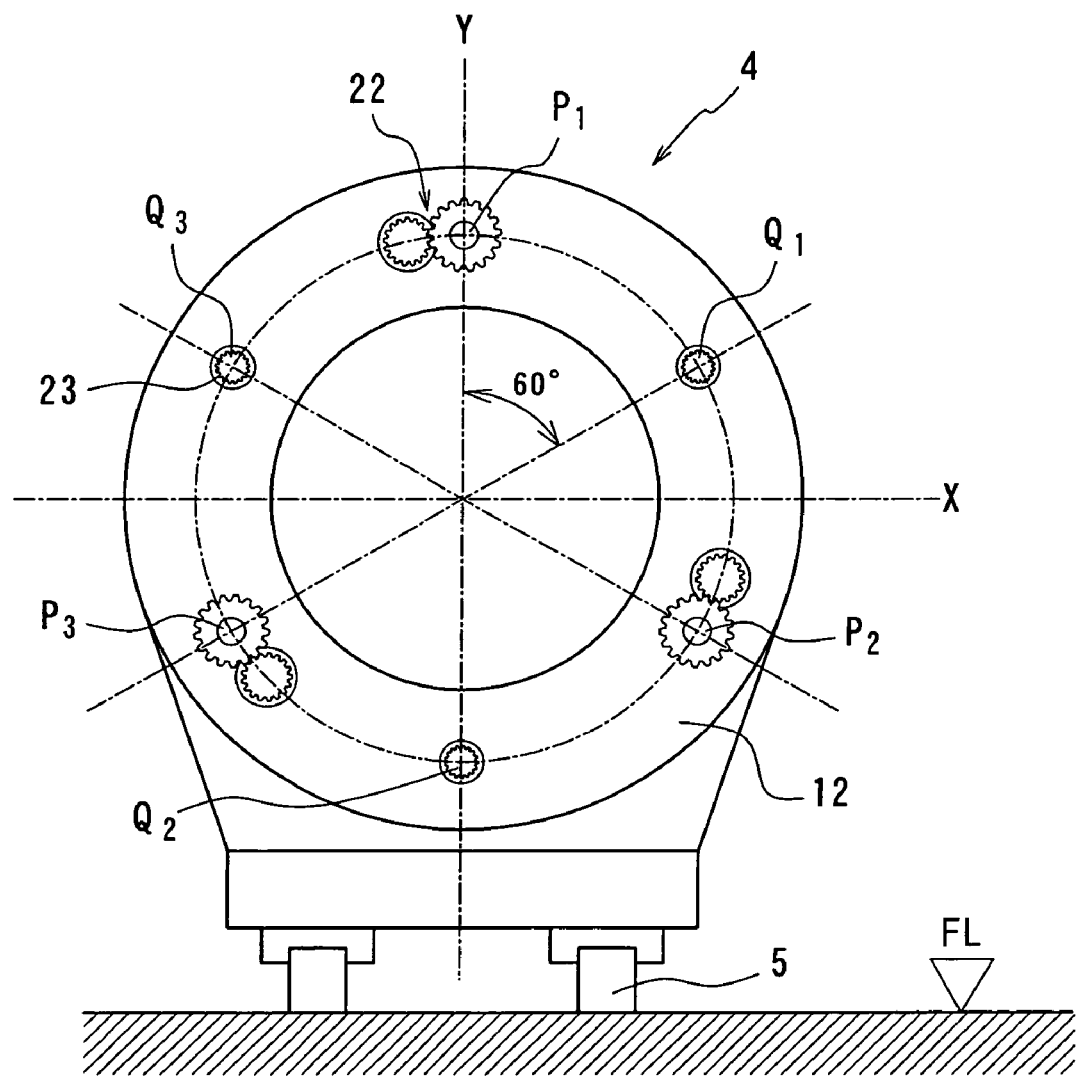
FIG. 4 is a side view as seen in the direction of arrows IV-IV in FIG. 2.
Figure 5:
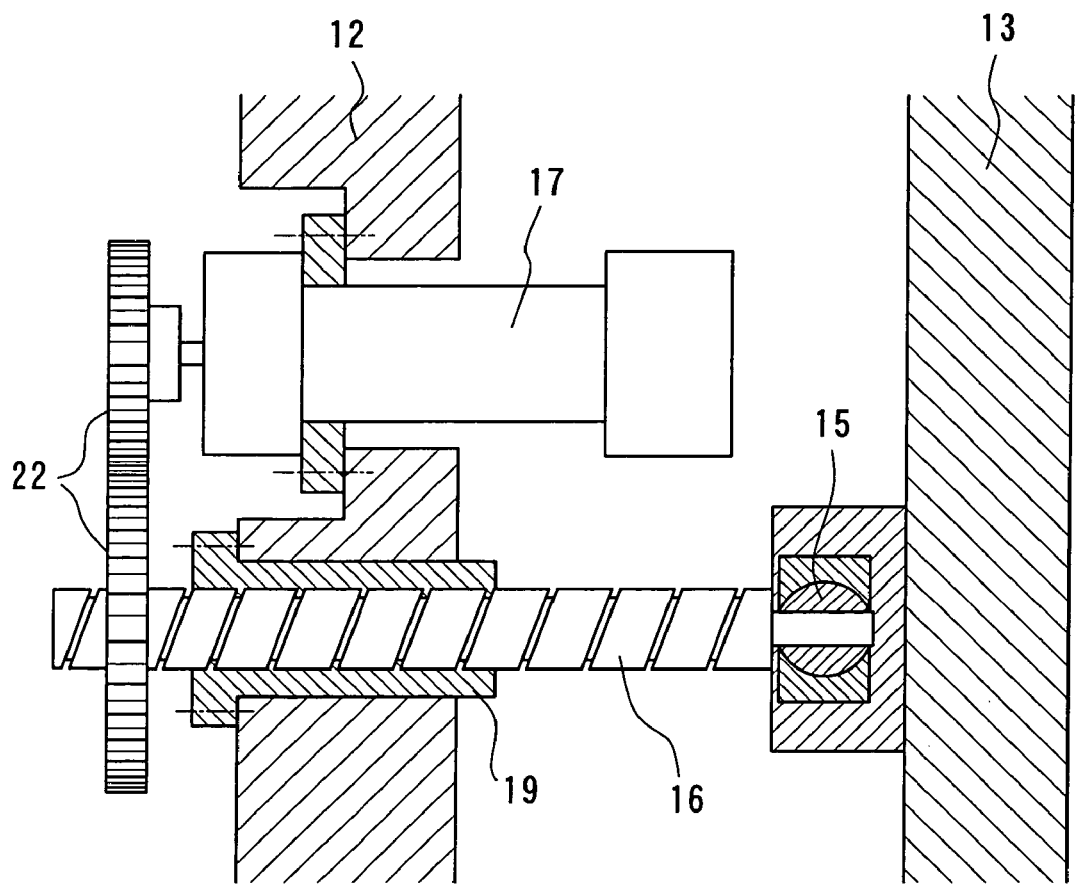
FIG. 5 is a sectional view of the region $d_1$ in FIG. 2.
Figure 6:
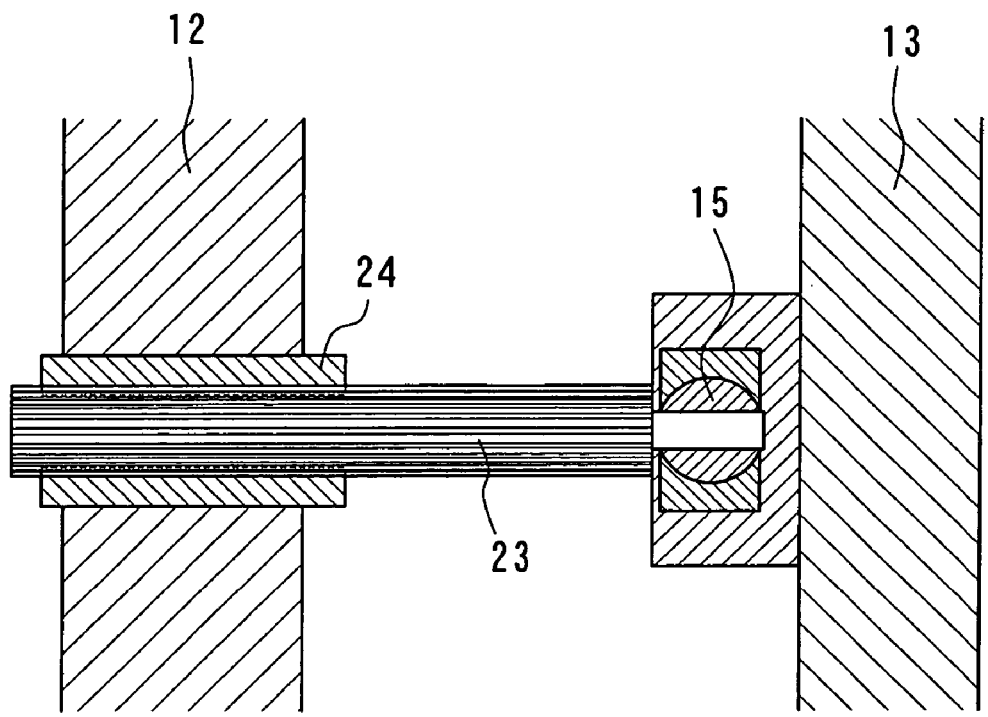
FIG. 6 is a sectional view of the region $d_2$ in FIG. 2.

FIGS. 2 to 6 illustrate the bead core supporting device 4, which is capable of controlling the inclination angle of the center axis of the bead core B, wherein FIG. 2 is a front view, FIG. 3 is a side view as seen in the direction of arrows III-III in FIG. 2, FIG. 4 is a side view as seen in the direction of arrows IV-IV in FIG. 2, and FIGS. 5 and 6 are sectional view of the regions $d_1$ and $d_2$ in FIG. 2, respectively. It will be noted that the bead core supporting device 4 includes a base portion 11 that is guided by the guide rails 5, an annular upright plate 12 fixedly secured on the base portion 11 and arranged perpendicularly to the center axis $L_0$ of the molding drum 3, a bead holder ring 13 secured to the annular upright plate 12 and adapted to hold the bead core B in parallel with each other, and a bead holder ring posture control means 14 for controlling an inclination angle of a center axis $L_2$ of the bead holder ring 13 relative to the center axis $L_1$ of the annular upright plate 12, within an angular range including zero degree.

A plurality of spherical bearings 15 are provided at two or more fixed positions on the bead holder ring 13, e.g., at three positions $P_1$, $P_2$ and $P_3$ which are spaced from each other in the circumferential direction by an angular distance of 120°. Ball screw rods 16 are provided, each having a tip end that is pivotally connected to the bead holder ring 13 in omni-directional manner by the spherical bearing 15. These ball screw rods 16 are threadedly engaged with female screw portions 19 extending through the annular upright plate 12. Each ball screw rod 16 can be rotated y driving a servomotor 17 incorporating a reduction mechanism, through a pair of gears 22, so that the ball screw rods 16 are axially moved to a desired position, under the engagement with the female screw portions 19.

Outer cylinders 24 are secured to the annular upright plate 11 at intermediate positions $Q_1$, $Q_2$, $Q_3$ between the adjacent ball screw rods 16, which are arranged in the circumferential direction. Ball spline shafts 23 are guided by the outer cylinders 24 through balls, so as to be slidably movable in the axial direction of the annular upright plate 11. Each ball spline shaft 23 has a tip end that is pivotally connected to the bead holder ring 13 in omni-directional manner by a spherical bearing 13 provided on the bead holder ring 13. The ball spline shafts 23 serve to slidably support the bead holder ring 13 relative to the annular upright plate 11.

The above-mentioned spherical bearings 15, ball screw rods 19, female screw portions 19, servomotor 17 with the reduction mechanism, gears 22, ball spline shafts 24 and outer cylinders 24, as a whole, constitute a bead holder ring posture control means 14.

The bead holder ring 13 comprises a plurality of magnet holders 6, which are arranged in the circumferential direction, each having a magnet 6A. These magnets 6A serve to attract and thereby hold the bead core B in a posture that is in parallel with the bead holder ring 13.

The bead core supporting device 4 constructed as above serves to control the inclination angle of the center axis of the bead core B by controlling the inclination angle of the center axis of the bead holder ring 13 relative to the center axis of the annular upright plate 11, under the operation to be described below. First of all, when it is desired to change the inclination angle of the center axis of the bead holder ring 13 by swinging it about a horizontal axis X (FIG. 4), the ball screw rod 16 situated at the position $P_1$ is advanced forwards by an amount "a" by actuating the servomotor 17 corresponding to the position $P_1$, while retracting the ball screw rods 16 situated at the positions $P_2$, $P_3$ backwards by half the amount (a/2). Since the tip end of each ball screw rod 16 is connected to the bead holder ring 13 through the spherical bearing 15, the forward or backward movement of the ball screw rod 16 causes the bead holder ring 13 to be inclined by a desired angle.

During the change in inclination angle of the center axis of the bead holder ring, a force is generated, which tends to change the distance between the neighboring spherical bearings 15. However, such a force can be sufficiently absorbed by setting a small angular movement range of the center axis, under the presence of a play within the spherical bearings 15.

Similarly, when it is desired to change the inclination angle of the center axis of the bead holder ring 13 by swinging it about a vertical axis Y, the ball screw rod 16 situated at the position $P_2$ is advanced forwards by an amount "a" by actuating the servomotor 17 corresponding to the position $P_2$, while retracting the ball screw rod 16 situated at the position $P_3$ backwards by the same amount (a) and maintaining the ball screw rod 16 situated at the position $P_1$ unchanged.

As explained above, the bead core supporting device 4 makes it possible to change the inclination angle of the center axis of the bead holder ring 13 in two independent directions by respectively desired angles, thereby allowing the center axis of the bead core B to be oriented in a desired direction.

In the embodiment described above, linear moving shafts for axially moving the spherical bearings 15 of the bead holder ring 13 are comprised of the ball screw rods 13. Alternatively, however, the spherical bearings may be moved by moving simple shafts in a stepless manner. Also, ball spline shafts are used as means for slidably supporting the bead holder ring 13 in the axial direction of the annular upright plate 11. Alternatively, however, the ball spline shafts may be replaced by simple linear moving shafts. In this instance, the provision of a plurality of such linear moving shafts makes it possible to bear the torque or moment about the axis.

Second Embodiment

A second embodiment of the tire molding machine according to the present invention will be described below. The tire molding machine of the second embodiment is featured by an arrangement wherein the bead core supporting device 4 in the tire molding machine 1 of the first embodiment is replaced by a bead core supporting device 4B. The same reference numerals are used to denote elements that are similar to those in the first embodiment.

Figure 7:
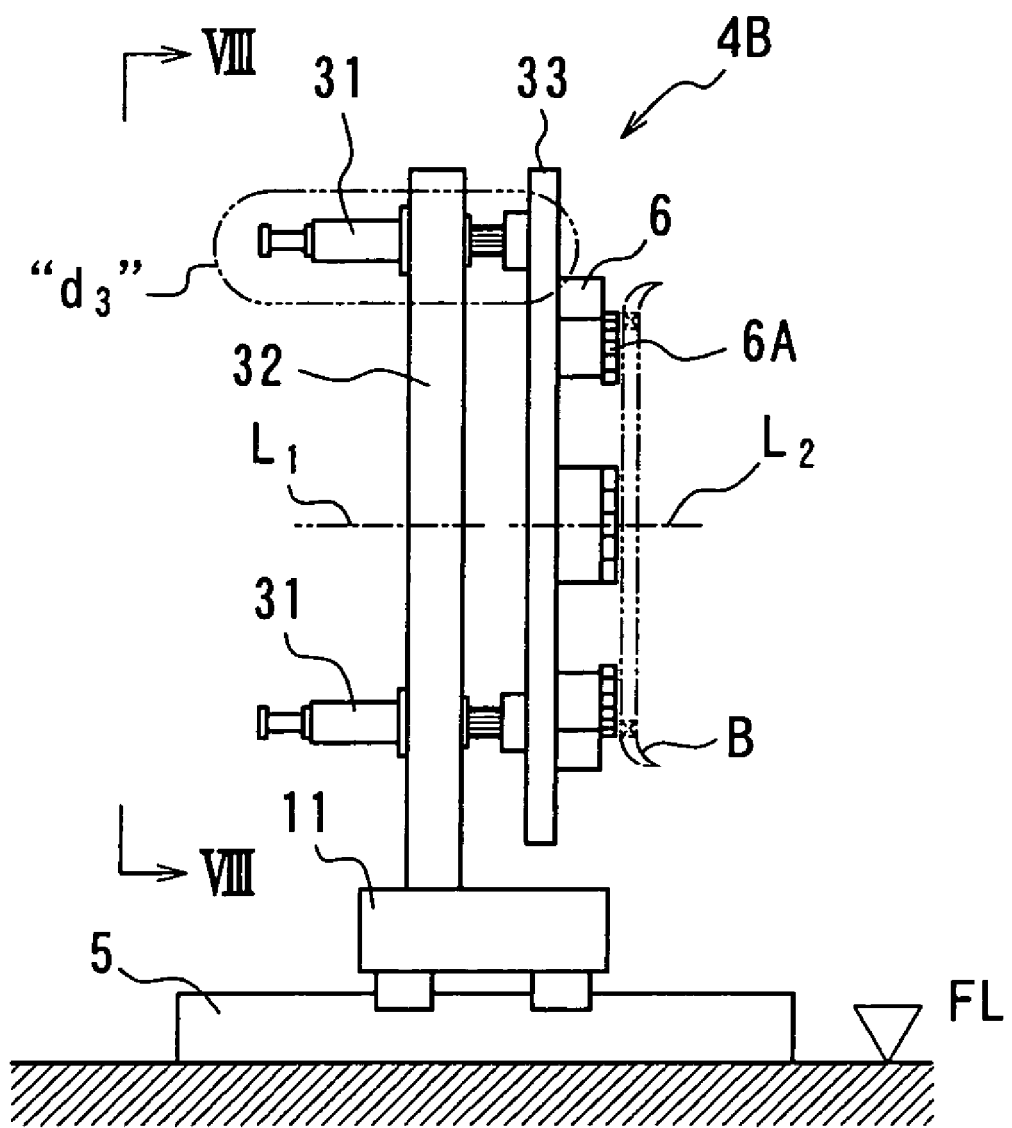
FIG. 7 is a front view of the bead core supporting device in a tire molding machine according to a second embodiment of the present invention.
Figure 8:
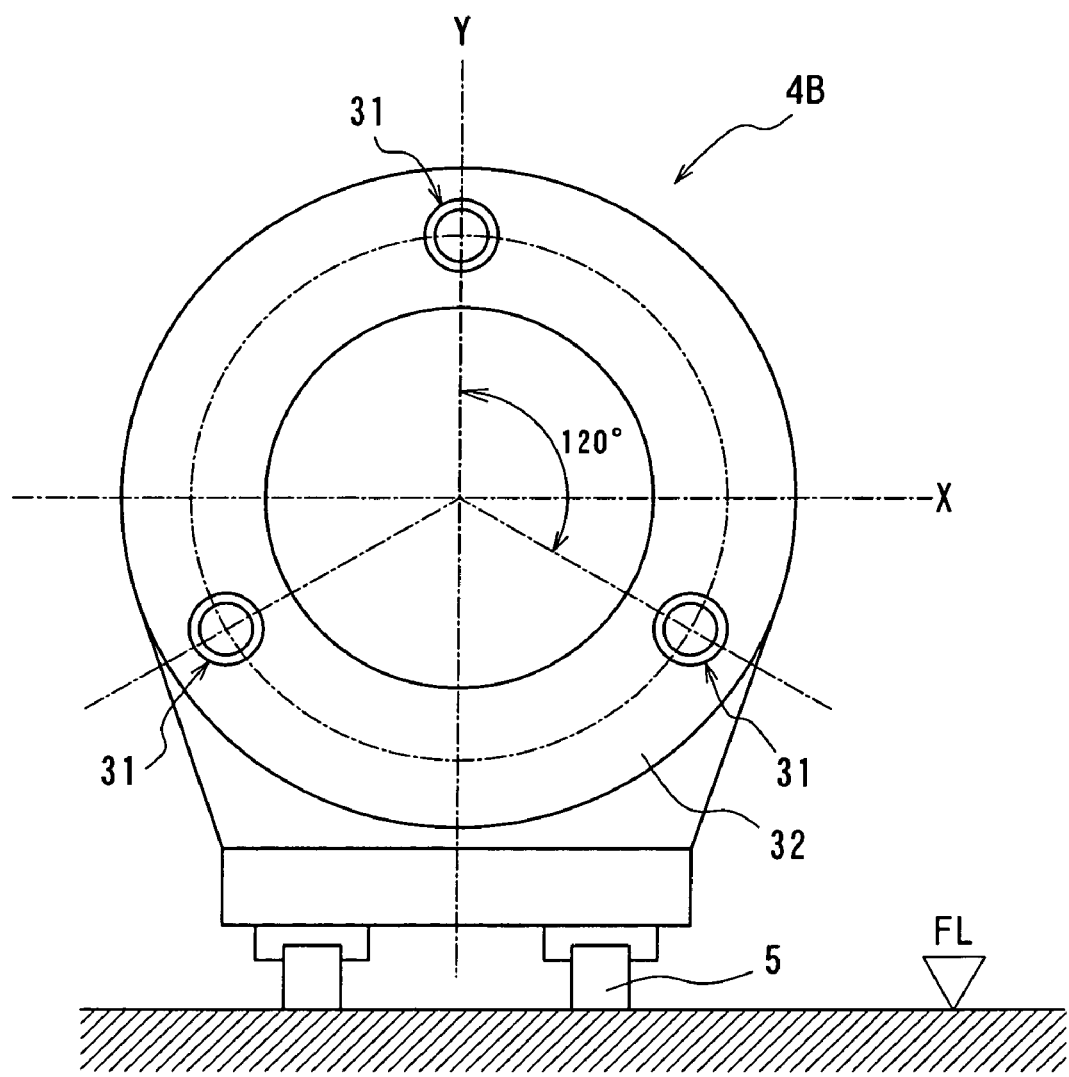
FIG. 8 is a side view as seen in the direction of arrows VIII-VIII in FIG. 7.
Figure 9:
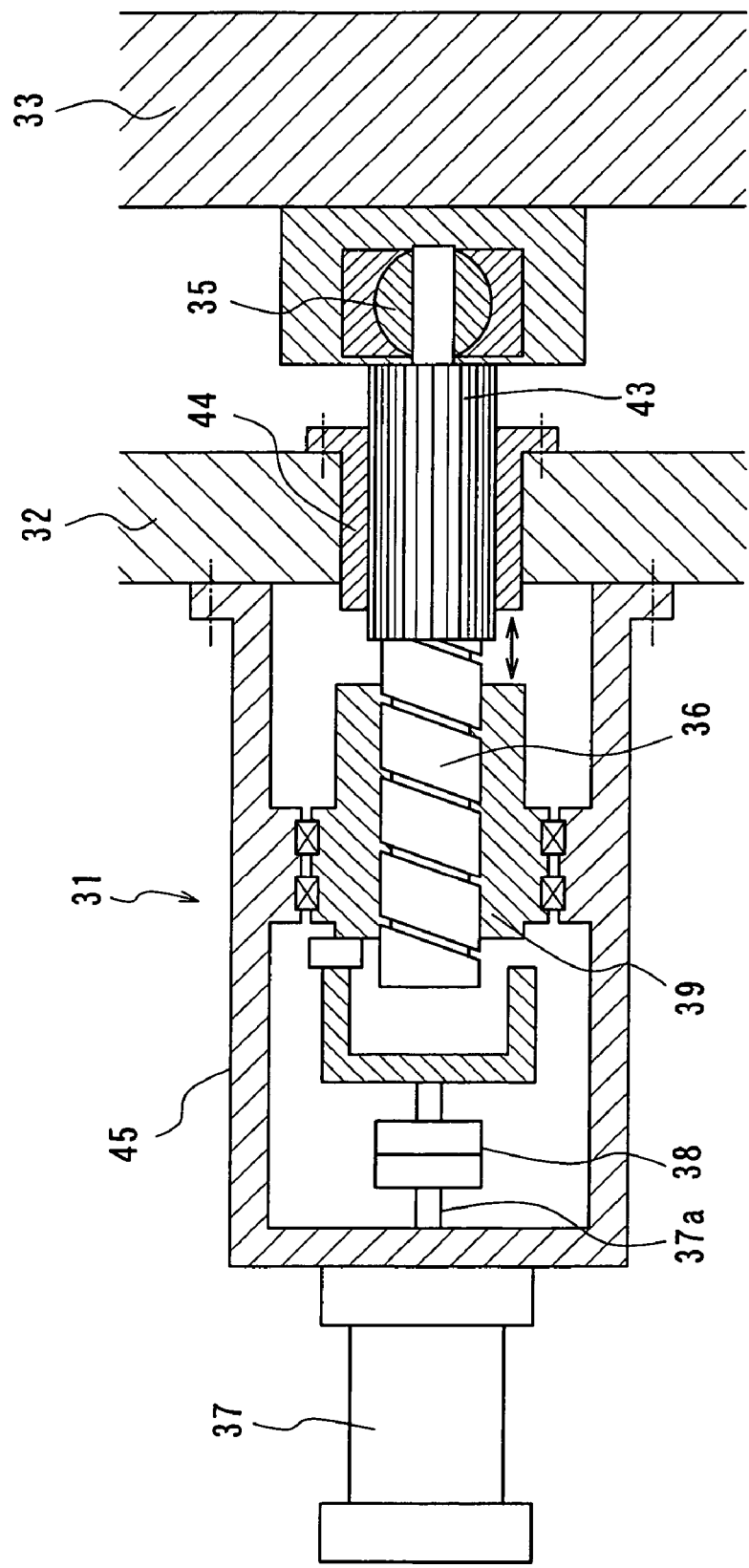
FIG. 9 is a sectional view of the region $d_3$ in FIG. 7.

FIG. 7 is a front view of the bead core supporting-device 4B, FIG. 8 is a side view as seen in the direction of arrows VIII-VIII in FIG. 7, and FIG. 9 is a sectional view of the region $d_3$ in FIG. 7. It will be noted that the bead core supporting device 4B includes a base portion 11 that is guided by the guide rails 5, an annular upright plate 32 fixedly secured on the base portion 11 and arranged perpendicularly to the center axis $L_0$ of the molding drum 3, a bead holder ring 33 secured to the annular upright plate 32 and adapted to hold the bead core B in parallel with each other, and a bead holder ring posture control means 34 for controlling an inclination angle of a center axis $L_2$ of the bead holder ring 33 relative to the center axis $L_1$ of the annular upright plate 32, within an angular range including zero degree.

The bead holder ring posture control means 34 comprises linear moving units 31 arranged at two or more fixed positions on the annular upright plate 32, e.g., at three positions which are spaced from each other in the circumferential direction by an angular distance of 120°. Spherical bearings 35 are provided on the bead holder ring 33 at positions corresponding to the above-mentioned three positions. Ball screw rods 36 extend in a direction perpendicular to the annular upright plate 32. Each ball screw rod 36 has a tip end that is connected to one end of a ball spline shaft 43, and the other end of the ball spline shaft 43 is connected to the spherical bearing 35. Thus, the ball screw rods 36 are pivotally connected to the bead holder ring 33 in omni-directional manner, through the ball spline shafts 43 and the spherical bearings 35.

The ball spline shafts 43 are provided as being axially slidably engaged with the outer cylinders 44 extending through the annular upright plate 32. In this instance, the spline shaft 43 and the outer cylinder 44 are engaged through axial spline grooves and thus prevented from relative rotation about the center axis, or relative movement in a plane perpendicular to the center axis.

The bead holder ring posture control means 34 is provided with cylindrical brackets 45 each having the female screw portion 39 in its radially inner side so as to allow is rotation about the center axis relative to the bracket 45 while preventing an axial movement. The servomotor 37 with the reduction mechanism is secured to the cylindrical bracket 45 with its output shaft 37a connected to the female screw portion 39 through a coupling 38.

The above-mentioned cylindrical brackets 45, spherical bearings 36, ball screw rods 36, female screw portions 39, servomotor 37 with the reduction mechanism, coupling 38, ball spline shafts 43 and the outer cylinders 44, as a whole, constitute the linear moving units 31.

In the linear moving units 31 constructed as above, when the servomotor 37 with the reduction mechanism is actuated to rotate its output shaft 37a, the female screw portion 39 is rotated to axially move the ball screw rod 36 in engagement with the female screw portion 39 so as to move the spherical bearing 35 in a direction perpendicular to the annular upright plate 32.

In the arrangement shown in FIG. 9, the ball screw rod 36 and the ball spline shaft 43 are shown as being integrated with each other, though they may be relatively movable toward and away from each other. In the latter case, the arrangement may be such that the ball screw rod 36 is effective only when the spherical bearing 35 is moved away from the annular upright plate 32, and the force required for moving the spherical bearing 35 toward the annular upright plate 32 is derived from the restoring force of the bead holder ring 33 itself, or from a suitable urging means, not shown. The bead holder ring 33 is essentially the same as than of the first embodiment in that a plurality of magnet holders 6 are arranged in the circumferential direction, and include respective magnets 6A that serve to attract and thereby hold the bead core B in a posture that is in parallel with the bead holder ring 33.

With the bead holder ring posture control means 34 constructed as above, the inclination angle of the center axis L2 of the bead holder ring 33 relative to the center axis L1 of the annular upright plate 32 can be controlled in any desired direction over an angular range of 360°. The manner of such control is essentially the same as that in the first embodiment, so that a duplicative explanation is omitted.

Third Embodiment

Figure 10:
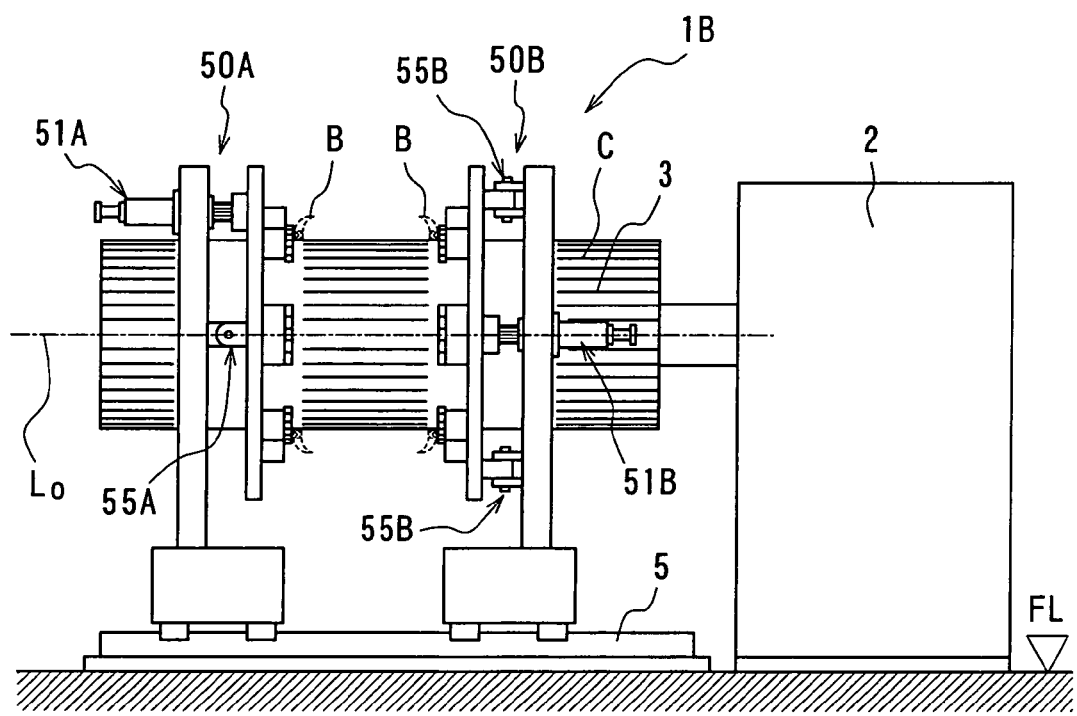
FIG. 10 is a schematic front view of the tire molding machine according to a third embodiment of the present invention.

A third embodiment of the tire molding machine according to the present invention will be described below. FIG. 10 is a schematic front view of the tire molding machine 1B according to the third embodiment. The tire molding machine 1B includes a machine main body 2, a molding drum 3 rotatably supported by the machine main body 2 in a cantilever manner and adapted to be applied with tire constitutive members including a carcass band C, and a pair of bead core supporting devices 50A, 50B for holding the respective bead cores B that are arranged on a radially outer side of the carcass band C applied on the molding drum 2 and axially spaced from each other by a predetermined distance.

These bead core supporting devices 50A, 50B are movable along the guide rails 5 extending in the axial direction of the molding drum 3, so as to locate the bead cores B to predetermined positions in the axial direction, on the radially outer side of the carcass band C. One of the bead core supporting devices 50A, 50B, i.e., the bead core supporting device 50A, is designed so as to control the inclination angle of the center axis of the bead core B only in the vertical direction, while the other bead core supporting device 50B is designed so as to control the inclination angle of the center axis of the bead core B only in the longitudinal direction.

FIGS. 11(a) and 11(b) are, respectively, a front view of the bead core supporting device 50A and a side view thereof as seen in the direction of arrows b-b in the front view, showing, and FIGS. 12(a) and 12(b) are, respectively, a front view of the bead core supporting device 50B and a side view thereof as seen in the direction of arrows b-b in the front view.

The bead core supporting device 50A includes a base portion 11 that is guided by the guide rails 5, an annular upright plate 52A fixedly secured on the base portion 11 and arranged perpendicularly to the center axis $L_0$ of the molding drum 3, a bead holder ring 53A secured to the annular upright plate 52A and adapted to hold the bead core B in parallel with each other, and a bead holder ring posture control means 54A for controlling an inclination angle of a center axis $L_2$ of the bead holder ring 53A relative to the center axis $L_1$ of the annular upright plate 52A, within an angular range including zero degree.

A linear moving unit 51A is arranged at an upper center region of the annular upright plate 52A, and swivel units 55A are arranged on both sides of an intermediate height region of the annular upright plate 52A. The linear moving unit 51A is similar to the linear moving unit 31 in the second embodiment, and serves to move the spherical bearing provided at an upper center region of the bead holder ring 53A. The swivel units 55A on both sides each includes a horizontal swivel shaft 56A, a bracket 58A which can be swiveled about the swivel shaft 56A and which is connected to the annular upright plate 52A, and a bracket 58A which can be swiveled about the swivel shaft 56A and which is connected to the bead holder ring 53A.

The above-mentioned linear moving unit 51A and swivel units 55A on both sides, as a whole, constitute the bead holder ring posture control means 54A for controlling the inclination angle of the center axis $L_2$ of the bead holder ring 53A relative to the center axis $L_1$ of the annular upright plate 52A, in the vertical direction.

Similarly, the bead core supporting device 50B includes a base portion 11 that is guided by the guide rails 5, an annular upright plate 52B fixedly secured on the base portion 11 and arranged perpendicularly to the center axis $L_0$ of the molding drum 3, a bead holder ring 53B secured to the annular upright plate 52B and adapted to hold the bead core B in parallel with each other, and a bead holder ring posture control means 54B for controlling an inclination angle of a center axis $L_2$ of the bead holder ring 53B relative to the center axis $L_1$ of the annular upright plate 52B, within an angular range including zero degree.

A linear moving unit 51B is arranged at an upper center region of the annular upright plate 52B, and swivel units 55B are arranged on both upper and lower sides of an intermediate height region of the annular upright plate 52B. The linear moving unit 51B is similar to the linear moving unit 31 in the second embodiment, and serves to move the spherical bearing provided at an upper center region of the bead holder ring 53B. The swivel units 55B on both upper and lower sides each includes a horizontal swivel shaft 56B, a bracket 58B which can be swiveled about the swivel shaft 56B and which is connected to the annular upright plate 52B, and a bracket 58B which can be swiveled about the swivel shaft 56B and which is connected to the bead holder ring 53B.

The above-mentioned linear moving unit 51B and swivel units 55B on both upper and lower sides, as a whole, constitute the bead holder ring posture control means 54A for controlling the inclination angle of the center axis $L_2$ of the bead holder ring 53B relative to the center axis $L_1$ of the annular upright plate 52B, in the longitudinal direction.

INDUSTRIAL APPLICABILITY

The tire molding machine according to the present invention is applicable to the production of tires having an excellent RFV level.

The invention claimed is:

1. A tire molding machine comprising:
a pair of bead core supporting devices configured to support respective bead rings arranged on a radially outer side of a carcass band and axially spaced by a predetermined distance from each other; and
a molding drum including a bead lock section configured to radially expand those portions of the carcass band that are situated on a radially inner side of the bead cores so as to urge the carcass band against the bead cores, at least one of the bead cores having a center axis with a controllable inclination angle, wherein:
at least one of the bead core supporting devices, that is configured to hold the at least one of the bead cores, comprises:
an annular upright plate;
a bead holder ring secured to the annular upright plate; and
a bead holder ring posture control portion configured to control an inclination angle of a center axis of the bead holder ring relative to the annular upright plate, wherein the bead holder ring is configured to hold the bead core in parallel with a surface of the ring, the bead holder ring posture control portion is configured to control the inclination angle of the center axis of the bead holder ring in two different directions, the bead holder ring posture control portion comprising:
spherical bearings arranged at not less than two locations on the bead holder ring, linear motion shafts each extending in a direction perpendicular to the annular upright plate and having a tip end that is pivotally connected to the bead holder ring in omni-directional manner by the spherical bearing; and
shaft moving portion configured to move the linear motion shafts to desired positions in an axial direction of the annular upright plate.

2. The tire molding machine according to claim 1, wherein the bead core supporting device is movable in the axial direction of the molding drum.

3. The tire molding machine according to claim 1, wherein the linear motion shaft comprises a ball screw rod engaged with a female screw in the annular upright plate, that shaft moving portion comprises a servomotor with a reduction portion configured to rotate the ball screw rod directly or indirectly through a gear mechanism, and the annular upright plate is axially slidably provided with a ball spline or a support shaft, the ball spline or support shaft having a tip end that is pivotally connected to the bead holder ring in omni-directional manner, by a spherical bearing provided on the bead holder ring.

4. The tire molding machine according to claim 3, wherein the bead core supporting device is movable in the axial direction of the molding drum.

5. The tire molding machine according to claim 1, wherein the bead core supporting device is movable in the axial direction of the molding drum.

6. A tire molding machine comprising:
a pair of bead core supporting devices configured to support respective bead rings arranged on a radially outer side of a carcass band and axially spaced by a predetermined distance from each other; and
a molding drum including a bead lock section configured to radially expand those portions of the carcass band that are situated on a radially inner side of the bead cores so as to urge the carcass band against the bead cores, at least one of the bead cores having a center axis with a controllable inclination angle, wherein:
at least one of the bead core supporting devices, that is configured to hold the at least one of the bead cores, comprises:
an annular upright plate;
a bead holder ring secured to the annular upright plate; and
a bead holder ring posture control portion configured to control an inclination angle of a center axis of the bead holder ring relative to the annular upright plate, wherein the bead holder ring is configured to hold the bead core in parallel with a surface of the ring, the bead holder ring posture control portion comprising:
spherical bearings arranged at not less than two locations on the bead holder ring, linear motion shafts each extending in a direction perpendicular to the annular upright plate and having a tip end that is pivotally connected to the bead holder ring in omni-directional manner by the spherical bearing; and
shaft moving portion configured to move the linear motion shafts to desired positions in an axial direction of the annular upright plate.

7. The tire molding machine according to claim 6, wherein the linear motion shaft comprises a ball screw rod engaged with a female screw in the annular upright plate, the shaft moving portion comprises a servomotor with a reduction portion configured to rotate the ball screw rod directly or indirectly through a gear mechanism, and the annular upright plate is axially slidably provided with a ball spline or a support shaft, the ball spline or support shaft having a tip end that is pivotally connected to the bead holder ring in omni-directional manner, by a spherical bearing provided on the bead holder ring.

8. The tire molding machine according to claim 7, wherein the bead core supporting device configured to move in the axial direction of the molding drum.

9. The tire molding machine according to claim 6, wherein the bead core supporting device configured to move in the axial direction of the molding drum.

10. A tire molding machine comprising:
a pair of bead core supporting devices configured to support respective bead rings arranged on a radially outer side of a carcass band and axially spaced by a predetermined distance from each other; and
a molding drum including a bead lock section configured to radially expand those portions of the carcass band that are situated on a radially inner side of the bead cores so as to urge the carcass band against the bead cores, at least one of the bead cores having a center axis with a controllable inclination angle, wherein:
at least one of the bead core supporting devices, that is configured to hold the at least one of the bead cores, comprises:
an annular upright plate;

a bead holder ring secured to the annular upright plate; and a bead holder ring posture control portion configured to control an inclination angle of a center axis of the bead holder ring relative to the annular upright plate, wherein the bead holder ring is configured to hold the bead core in parallel with a surface of the ring, both of the bead core supporting devices comprise respective bead holder ring posture control portion, the bead holder ring posture control portion each configured to control the inclination angle of the center axis of the bead holder ring in a single direction, the angular control directions being different from each other among the respective bead core holder rings, the bead holder ring posture control portion comprising:

spherical bearings arranged at not less than two locations on the bead holder ring, linear motion shafts each extending in a direction perpendicular to the annular upright plate and having a tip end that is pivotally connected to the bead holder ring in omni-directional manner by the spherical bearing; and shaft moving portion configured to move the linear motion shafts to desired positions in an axial direction of the annular upright plate.

11. The tire molding machine according to claim 10, wherein the linear motion shaft comprises a ball screw rod engaged with a female screw in the annular upright plate, the shaft moving portion comprises a servomotor with a reduction portion configured to rotate the ball screw rod directly or indirectly through a gear mechanism, and the annular upright plate is axially slidably provided with a ball spline or a support shaft, the ball spline or support shaft having a tip end that is pivotally connected to the bead holder ring in omni-directional manner, by a spherical bearing provided on the bead holder ring.

12. The tire molding machine according to claim 11, wherein the bead core supporting device is movable in the axial direction of the molding drum.

13. The tire molding machine according to claim 10, wherein the bead core supporting device configured to move in the axial direction of the molding drum.

* * * * *